United States Patent [19]
Burgis

[11] Patent Number: 5,411,685
[45] Date of Patent: May 2, 1995

[54] GAS CONTROL UNIT AND PROCESS FOR GAS-ASSISTED INJECTION MOLDING

[75] Inventor: Stephen A. Burgis, Birmingham, Mich.

[73] Assignee: Design-Rite, Inc., Sterling Heights, Mich.

[21] Appl. No.: 957,987

[22] Filed: Oct. 8, 1992

[51] Int. Cl.⁶ .................. B29C 45/00; B29C 45/03; B29C 45/76
[52] U.S. Cl. .................. 264/40.5; 264/572; 425/130; 425/149
[58] Field of Search ............... 204/40.3, 572; 425/130, 425/147, 149

[56] References Cited

U.S. PATENT DOCUMENTS

| | | | |
|---|---|---|---|
| 5,032,345 | 7/1991 | Hendry | 264/572 |
| 5,039,463 | 8/1991 | Loren | |
| 5,056,997 | 10/1991 | Hayashi et al. | |
| 5,114,660 | 5/1992 | Hendry | 264/572 |
| 5,118,455 | 6/1992 | Loren | 264/572 |
| 5,137,680 | 8/1992 | Hendry | 264/572 |
| 5,141,682 | 8/1992 | Steinbichler et al. | 264/572 |
| 5,169,648 | 12/1992 | Eckardt et al. | 264/572 |

*Primary Examiner*—Catherine Timm
*Attorney, Agent, or Firm*—Remy J. VanOphem

[57] ABSTRACT

A gas control unit for a gas-assisted injection molding system, wherein a quantity of gas is introduced into a mold cavity in combination with a quantity of plastic material during the molding process. The gas control unit operates on the basis of regulating the mass of gas within the system, as opposed to the final hold pressure. Because the mass of the gas is constant within the gas control unit throughout an injection cycle, a preferred initial-to-final (hold) pressure ratio can be determined through mathematical computations for a particular molding system. As a result, once the required mass of gas has been isolated from a suitable source, releasing the gas to the mold cavity results in a predictable pressure. This capability permits the gas control unit to determine whether the gas has fully expanded and, therefore, whether the gas has properly filled the mold cavity so as to produce a properly molded article.

21 Claims, 1 Drawing Sheet

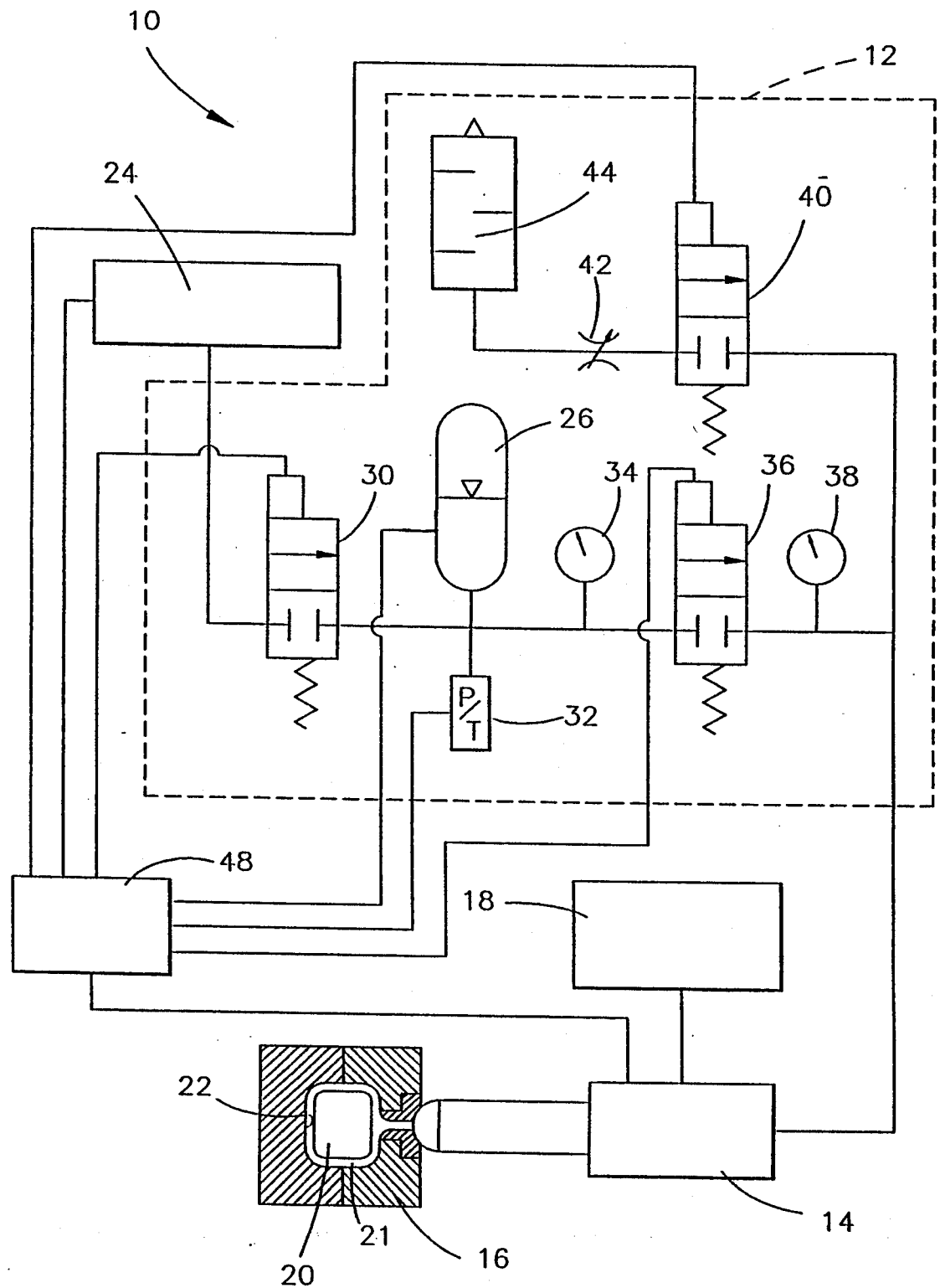

GAS CONTROL UNIT AND PROCESS FOR GAS-ASSISTED INJECTION MOLDING

BACKGROUND OF THE INVENTION

1. Field of the Invention

The present invention generally relates to control systems for regulating the flow of fluids. More specifically, this invention relates to a gas control system for regulating the flow of a gas into a mold during an injection molding process, wherein the quantity of gas injected is accurately controlled in a manner that permits statistical monitoring and evaluation of the molding process.

2. DESCRIPTION OF THE PRIOR ART

Within the plastic molding industry, it is well known to inject a pressurized gas along with a quantity of molten plastic, or melt, into the mold cavity during the molding process. Because the pressurized gas will flow along a path of least resistance, within the mold cavity the gas flows through the warmer, less viscous melt which is located away from the mold cavity surfaces. As a result, the gas generally flows through the approximate center of the flow path cross section, urging the melt into contact with the surfaces of the mold cavity. At the same time, the gas forms a hollow channel or void within the molded article during the molding process.

The use of gas serves several useful purposes. By continuously applying pressure throughout the molding cycle, the gas maintains the melt in contact with the mold cavity so as to force the melt to assume the shape of the mold cavity and thereby reduce the tendency for surface flaws, sink holes and warpage. To achieve this aspect, the gas must remain pressurized until the melt has sufficiently cooled within the mold cavity. Another benefit is that the gas assists in forming long and narrow molded articles in that the gas rapidly urges the melt through the mold cavity, preventing the melt from prematurely solidifying prior to completely filling the mold cavity. Again, because the gas will tend to flow through the least viscous melt at the approximate center of the mold cavity, the melt will cool and solidify from the surface inward towards the center of the mold cavity. This effect yields another advantage in that the resulting hollow structure of the molded articles will, by nature, be lighter, using less plastic material for a given geometry and size.

Numerous gas-assisted molding methods and systems have been suggested by the prior art. Examples include U.S. Pat. Nos. 5,039,463 to Loren and 5,056,997 to Hayashi et al., each of which control the injection of the gas from the standpoint of controlling the gas pressure. Specifically, both Loren and Hayashi et al. attempt to perform the gas-assisted injection process by introducing and temporarily holding the gas at one or more predetermined gas pressure levels, or "hold" pressures, within the mold cavity until the plastic has sufficiently solidified.

Though both Loren and Hayashi et al. each begin with a "fixed" volume of gas, the references teach that it is specifically the pressure which is regulated at a predetermined level during the injection process in order to accomplish the invention set forth therein. In essence, the volume of gas used by both Loren and Hayashi et al. varies during the injection process in that the hold pressure is regulated from a higher pressure, necessitating that some gas will be vented from the system to attain the preferred, lower hold pressure. For example, Loren teaches charging a receiver with a gas to an extremely high fixed pressure (14,000 psi), and then regulating the gas to a desired pressure level (6000 psi) before introducing it into the mold cavity. The desired pressure level can be sustained throughout the mold cycle due to the reservoir of gas available from the receiver.

Alternatively, Loren teaches that a fixed volume storage system can be charged to 6000 psi by the receiver, after which the fixed volume storage system is shut off from the receiver. The 6000 psi gas within the fixed volume storage system can then be vented to the mold cavity, such that the mold cavity is initially pressurized to 6000 psi with the gas. The pressure is then gradually reduced to about 1000 psi by a regulating relief valve. The 1000 psi pressure is then held for the remainder of the cycle, during which the plastic melt solidifies.

While controlling the gas-assisted injection process by regulating the pressure generally works satisfactorily, a significant disadvantage with such an approach is that there is no means provided by which an operator can determine whether the gas has actually reached or entered the mold cavity. As with the teachings of Loren, the gas pressure is both regulated and detected well upstream of the mold cavity. As a result, the gas supply line can unknowingly be obstructed downstream from the regulator or pressure sensor by such things as contaminants in the gas or by plastic within the sprue or gates which feed both the gas and plastic melt to the mold cavity. In a high capacity production process such as injection molding, parts resulting from the above defective process will typically go unnoticed until many parts have been produced, resulting in a substantial loss of time and a high scrap rate.

It is obviously impractical to regulate the gas pressure downstream of the mold cavity during the injection cycle in an attempt to overcome the above shortcoming. While it is possible to provide a pressure sensor in direct communication with the mold cavity, such an approach is generally unacceptable from the standpoint of surface blemishes and defects created on the molded article. Even if attempted, the pressure sensor may likely relay a faulty reading due to being in direct contact with the liquid plastic and not the pressurized gas. Furthermore, such a pressure sensor would be exposed to cyclical high temperatures, which would have an adverse effect on the accuracy and life of the sensor.

From the above discussion, it can be readily appreciated that the prior art does not disclose a gas-assisted injection system which is capable of immediately detecting when the gas has failed to enter and expand the melt within the mold cavity. Consequently, the prior art is unable to immediately notify a system operator or cause a system shutdown upon the occurrence of such a failure.

Accordingly, what is needed is an uncomplicated system for injecting gas into a mold cavity wherein the system is able to immediately and continuously detect whether the gas has in fact entered the mold cavity and, as a result, whether the injection molding process is producing flawed parts from the standpoint of inadequate gas fill or pressure during the molding operation.

SUMMARY OF THE INVENTION

According to the present invention there is provided a gas control unit for a gas-assisted injection molding system, wherein a quantity of gas is introduced into a mold cavity in combination with a quantity of plastic material during the molding process. The gas control unit of the present invention is versatile in that its operational approach is applicable to practically any injection molding application, encompassing diverse sizes and geometries of mold cavities. Furthermore, the gas control unit is uncomplicated, relying upon flow components which are well known in the art.

A feature which distinguishes the gas control unit of the present invention from the prior art is its ability to supply a predetermined mass of gas to the mold cavity, as opposed to a predetermined pressure. In that the mass of the gas is known, its volume and pressure can be determined at any given time through mathematical computations during the injection cycle. As a result, once the predetermined mass of gas has been isolated from a suitable source, its pressure will be primarily dependent upon the volume of the system. This capability permits the gas control unit to determine, through monitoring pressures, whether the gas has been fully injected within the mold cavity, which is necessary to produce a properly molded article.

The gas control unit includes an accumulator for containing the predetermined mass of gas, a control valve upstream of the accumulator and a control valve downstream of the accumulator. The injection molding apparatus is placed downstream from the downstream control valve, and a pressure sensing device is located between the accumulator and the mold cavity, and more preferably near the accumulator. The accumulator is charged with a suitable gas, and preferably an inert gas such as nitrogen, from a high pressure source.

The charging of the accumulator is regulated by the upstream control valve, which is closed after an appropriate mass of the gas has accumulated in the accumulator. During the charging operation, the downstream control valve remains closed to prevent flow to the mold cavity. Once the appropriate mass of gas is accumulated within the accumulator, the downstream control valve vents the mass of gas to the mold cavity such that the mass is distributed between the accumulator, the mold cavity and the flow passage therebetween. Once the gas has reached steady state, its pressure is compared to a predetermined pressure level to monitor and evaluate the injection cycle.

The mass of gas which is required for a successful injection cycle is determined by the needs of the injection system and, more specifically, the volume of the mold cavity and the pressure which is preferably held as the plastic melt cools and solidifies. This "hold" pressure will serve as the predetermined pressure against which all injection cycles are compared. By applying the ideal gas law, or any suitable adaptation thereof, the pressure which must be initially attained within the accumulator to produce the desired hold pressure can be determined.

As noted above, the pressure at the end of the injection cycle is compared to the predetermined pressure so as to determine whether the gas has fully expanded throughout the injection system, including the mold cavity. It is preferable, but not necessary, that the gas control unit include a programmable logic controller or other suitable control device for evaluating the pressure at the end of the cycle. Using a logic controller permits the entire injection system to be coordinated to operate efficiently. In addition, the system can be adaptive in that compensations can be made for temperature and other transient influences.

According to a preferred aspect of this invention, the gas control unit relies upon delivering a mass of gas through the injection system so as to permit the evaluation of the injection cycle based upon the final gas pressure at the end of the cycle. Knowledge of this pressure enables the gas control unit to immediately and continuously detect during subsequent cycles whether the gas has in fact entered the mold cavity and, as a result, whether the injection molding process has produced a good or flawed part from the standpoint of adequate gas fill within the mold cavity.

In addition, the gas control unit can be adapted for use under differing modes of operation, whether it be primarily manual control by an operator, or automatic control during high volume production, in which the gas control unit can regulate the injection molding process with minimal attention from operators.

Another significant advantage of the present invention is that the gas control unit is relatively uncomplicated, relying upon a minimal number of well known fluid control devices which are conventionally in a system for injecting gas into a mold cavity. However, the manner in which the devices are used together is entirely different in terms of the parameter being controlled, in that the mass of the gas is regulated at the beginning of the cycle, instead of pressure being regulated at the end of the cycle.

In addition, the gas control unit can be made adaptive by incorporating a logic controller. By determining what final gas pressure is necessary to produce good parts, the system can accumulate the necessary mass of gas to produce the final pressure, while compensating for changes in temperature of the gas.

Accordingly, it is an object of the present invention to provide a gas-assisted injection molding system for injecting gas into a mold cavity, wherein the system is able to immediately and continuously detect whether the gas has sufficiently filled the mold cavity as a method for determining whether the injection molding process is producing acceptable or flawed parts.

It is a further object of the invention that the gas-assisted injection molding system operate on the basis of a predetermined mass of gas within the system by which gas pressure can be monitored to evaluate the operation of the molding operation.

It is still a further object of the invention that the gas-assisted injection molding system be capable of providing a specific volume of gas to the mold cavity, which is delivered in conjunction with the need to fill the mold cavity with a specified quantity of plastic melt.

It is another object of the invention that the predetermined mass of gas be determined on the basis of the desired hold pressure during which the molten plastic solidifies to form the molded part.

It is yet another object of the invention that the gas-assisted injection molding system be readily adaptable in terms of sizes and geometries of mold cavities which can be used, fluctuating ambient temperatures, and various hold pressures and durations necessitated for a specific molding process.

It is still another object of the invention that the gas-assisted injection system require a minimal number of fluid control devices so as to be relatively uncomplicated and thereby optimize its maintainability and cost.

Other objects and advantages of this invention will be more apparent after a reading of the following detailed description taken in conjunction with the drawing provided.

BRIEF DESCRIPTION OF THE DRAWINGS

The Figure provided schematically illustrates a gas-assisted injection system in accordance with the preferred embodiment of this invention.

DETAILED DESCRIPTION OF THE PREFERRED EMBODIMENT

With reference to the Figure, there is shown schematically a gas-assisted injection molding system 10 which includes a gas control unit 12 according to the present invention. The gas control unit 12 operates with the molding system 10 to produce plastic molded articles 21 which are characterized by having one or more hollow portions 20 formed within their cross section.

As is conventional, the molding system 10 includes an injection nozzle 14 for injecting molten plastic, or melt, into a mold 16. The mold 16 defines a mold cavity 22 by which the final geometry of the molded article 21 is determined. The injection nozzle 14 is supplied with a quantity of plastic from a suitable source, which is conventionally a hopper 18. The hopper 18 will generally supply the injection nozzle 14 with plastic pellets which are plasticized, or melted, within the barrel of the injection nozzle 14 prior to being injected into the mold cavity 22.

During the operation of the gas-assisted injection molding system 10, a quantity of gas is injected into the mold cavity 22 along with a specified quantity of melt. The gas most often chosen for molding operations is nitrogen, which is preferable, in that nitrogen is inert to plastic compounds. Once the gas and melt are injected into the mold cavity 22, the melt will cool to form the molded article 21. While being injected, the gas will establish itself centrally within the mold cavity 22, forming the hollow portion 20 within the molded article 21. The gas forces the melt against the mold cavity 22 to ensure that the final molded article 21 acquires the internal geometry of the mold cavity 22. At the same time, the molded article 21 advantageously acquires a hollow cross section as a result of the hollow portion 20 defined by the gas, thereby reducing the weight of the molded article 21 and the quantity of plastic necessary to form the molded article 21.

At the completion of the mold cycle, the gas is vented from the mold cavity 22 and the molded article 21 is ejected from the mold cavity 22 by ejection pins (not shown), in a conventional manner.

According to the present invention, the gas control unit 12 operates to introduce a predetermined volume of gas into the mold cavity 22 in combination with a specified quantity of plastic melt. The volume of gas required is derived from the simple relationship:

$$V_{gas} = V_{cavity} - V_{plastic}$$

wherein $V_{gas}$ is the volume of gas required within the mold cavity 22, $V_{cavity}$ is the internal volume of the mold cavity 22, and $V_{plastic}$ is the desired quantity of plastic for the molded article 21, taking into consideration the strength, rigidity, etc., required of the molded article 21.

To provide this specific volume of gas, the gas control unit 12 includes an accumulator 26 of a type well known in the art. The principal characteristic of THE accumulator 26 is that it must have a sufficient capacity to house the gas prior to the gas being vented to the mold cavity 22. More specifically, the accumulator 26 is pumped to a pressure to contain a predetermined mass of the gas which is sufficient, at a preferred "hold" pressure level, to fill a volume V defined by: the accumulator 26; $V_{gas}$ for the particular mold cavity 22 and molded article 21; and a passage between the accumulator 26 and the mold cavity 22. The gas contained within the accumulator 26 remains entirely within the gas control unit 12 during the injection operation and, according to the operation of the gas control unit 12, the hold pressure is not directly regulated. In fact, the hold pressure is determined strictly by the amount of gas initially stored within the accumulator 26 at the beginning of a molding cycle.

Typically, hold pressures are less than about 6000 psi, and vary with the particular molded article 21 being produced. Because the gas control unit 12 operates with a specific mass of gas, attaining the desired hold pressure after the gas is released from the accumulator 26 to the mold cavity 22 requires several preliminary molding cycles with close inspection of the molded article 21 to determine whether proper expansion has occurred. As will be explained below, the gas control unit 12 of the present invention substantially automates this process.

Theoretically, by knowing the volume of gas necessary to fill the accumulator 26, mold cavity 22 and the passage therebetween at the hold pressure, the mass of the gas which must be accumulated in the accumulator 26 prior to the injection cycle can be determined according to the ideal gas law:

$$m = PV/RT,$$

wherein m is the mass of the gas; P is the desired hold pressure at the end of the molding cycle; V is the combined volume of the accumulator 26, $V_{gas}$, and the passage between the accumulator 26 and the mold cavity 22; R is the ideal gas constant for the gas; and T is the gas temperature. While the ideal gas law is often sufficiently accurate for an estimate of gas behavior, it will be readily appreciated by those skilled in the art that more accurate computational methods are known and can be employed within the teachings of this invention.

With knowledge of the mass of gas which must be accumulated, the required pressure to which the accumulator 26 must be charged can also be determined by the ideal gas law:

$$P = mRT/V,$$

wherein P is the initial pressure within the accumulator 26; m is the previously calculated mass of the gas; R is the ideal gas constant for the gas; T is the gas temperature; and V is the volume of the accumulator 26.

From the above, the following fundamental parameters are now known: the required mass of gas (though possibly based on a preliminary hold pressure), and the initial and hold pressures for the gas. The remaining variables for the ideal gas law—volume and temperature—are highly repeatable within a particular injection apparatus once the molding system 10 reaches a continuous, steady-state operation. Therefore, once a suitable hold pressure has been determined for the particular process, all that is necessary to successfully operate the molding system 10 is to properly charge the accumulator 26 with the required mass of gas.

Because the gas control unit 12 operates with a constant mass of gas, and the temperatures and volumes for the system will remain substantially constant under normal operating conditions, only pressure remains as a variable under the ideal gas law. As a result, the gas control unit 12 can operate solely on the basis of the ratio between the hold and initial pressures for a particular molding operation. Because the gas control unit 12 operates with a constant mass of gas, according to the ideal gas law:

$$P_1/P_2 = (V_1/T_1)/(V_2/T_2)$$

this relationship allows for two general modes of operation for the gas control unit 12. The first mode involves estimating the initial pressure needed to acquire the desired hold pressure and, during several injection cycles, making manual adjustments to the initial pressure until the desired hold pressure is achieved. The second mode involves designating a hold pressure and allowing a computer, during several injection cycles and mathematical iterations, to determine the required initial pressure which will attain the designated hold pressure.

The fluid control devices necessary to perform the above operations are as follows. To charge the accumulator 26, the present invention requires only a suitable high pressure source for the gas, such as a booster 24. Typically, the booster 24 will deliver gas to the accumulator 26 at a pressure of about 10,000 to about 15,000 psi. A flow control valve may be placed between the booster 24 and the accumulator 26 to permit accurate control of the gas flow rate. However, the preferred embodiment does not contemplate the use of such a flow control valve. Immediately upstream of the accumulator 26 there is a normally-closed on-off valve ("upstream valve 30"). The upstream valve 30 enables the passage between the booster 24 and the accumulator 26 to be rapidly and reliably closed once the proper mass of gas has been accumulated.

Downstream from the accumulator 26 is a second normally-closed on-off valve ("downstream valve 36"). The downstream valve 36 is operable to both accumulate the gas within the accumulator 26 and vent the gas to the mold cavity 22. Pressure gages 34 and 38 on either side of the downstream valve 36 enable an observer to quickly determine whether or not gas has been vented to the mold cavity 22.

A pressure transducer 32 senses the pressure of the gas accumulated within the accumulator 26. The pressure transducer 32 operates to monitor the pressure within the accumulator 26 so as to determine when the accumulator 26 has been charged with the required mass of gas, i.e., the initial pressure for the injection cycle. The pressure transducer 32 also detects the hold pressure at the end of the injection cycle, as an indication of gas volume based upon the presence of the known mass of gas which was accumulated at the beginning of the injection cycle. It is preferable to measure the hold pressure at the end of the cycle near the accumulator 26 in that positions further downstream from the accumulator 26 may be unstable during the injection cycle because of the gas motion and sudden changes in pressure.

As previously noted, over time, the temperature of the gas within the gas control unit 12 will stabilize near ambient temperature. In addition, the gas temperature within the mold cavity 22 will rapidly attain a temperature substantially close to the melt temperature. These conditions will be highly repeatable once the molding system 10 reaches a steady-state operating condition. Accordingly, it is not necessary that temperature be measured continuously. However, if desired the gas control unit 12 can be controlled to compensate for temperature effects. If more accurate determinations are desired, a temperature transducer may be directly used by the gas control unit 12.

Connected to the passage which connects the downstream valve 36 to the mold cavity 22 is a vent line which vents the gas to atmosphere after the molding cycle is complete. The vent line includes a normally-closed on-off valve ("vent valve 40"), a flow control valve 42 and a muffler 44. The vent valve 40 remains closed other than when it is venting the gas within the mold to atmosphere.

To coordinate and automate the operation of the gas control unit 12, a programmable logic controller 48, or other suitable control device, is preferably included within the molding system 10. The controller 48 preferably communicates with the booster 24, the upstream valve 30, the downstream valve 36, a temperature transducer, the pressure transducer 32, the vent valve 40 and the injection nozzle 14.

The controller 48 can be employed to either command the booster 24 to operate until the accumulator 26 has been fully charged, and thereafter shut down, or the controller 48 can simply monitor the booster 24 to ensure that it is operating properly and supplying gas according to requirement. The injection nozzle 14 can be monitored and controlled from the perspective of signalling the beginning of the injection process and detecting the end of the injection process, at which time the controller 48 can command the molded article 21 to be ejected from the mold cavity 22.

Primarily, the controller 48 serves to synchronize the operation of the on-off valves 30, 36 and 40 to properly route the gas through the gas control unit 12 cycle. The initial and final (hold) pressure signals received from the pressure transducer 32 permit the controller 48 to determine the charging of the accumulator 26 and to evaluate the initial pressure requirements on the basis of the resulting hold pressure. The controller 48 is, therefore, capable of automating the second of the two previously-described modes of operation. Specifically, an operator can select a preferred hold pressure with knowledge of the mass of the gas required for the application and allow the controller 48 to initially estimate, make the necessary adjustments, and eventually attain the required initial pressure over several injection cycles. Afterwards, the gas control unit 12 will operate on the basis of charging the accumulator 26 to the required constant mass of gas at the initial pressure and signalling an error if the hold pressure significantly deviates from the originally selected hold pressure.

By regulating each of the above devices with the controller 48, the operation of the gas control unit 12 essentially becomes automatic. A typical cycle will entail the controller 48 sensing the end of the previous injection cycle, and then closing each of the valves 30, 36 and 40. Gas can then be delivered to the accumulator 26 by opening the upstream valve 30, while the downstream valve 36 and the vent valve 40 remain closed. As set forth above, once the controller 48 has determined the initial pressure necessary to attain the desired hold pressure, the upstream valve 30 can be commanded by the controller 48 to remain open until the pressure transducer 32 detects the required initial pressure. At this time, the upstream valve 30 will close and, after a suitable system delay where desired, the downstream valve 36 will open to vent the gas to the mold cavity 22. In doing so, the predetermined mass of gas will become distributed between the accumulator 26, the mold cavity 22, and the passage therebetween. The gas will quickly stabilize and its final hold pressure will be sensed by the pressure transducer 32.

Alternatively, the gas can be released in pulses to the mold cavity 22 by cycling the downstream valve 36 through a series of successive venting steps until all of the mass of gas has been substantially vented to the mold cavity 22. Such a procedure may be desirable under particular circumstances, such as when different areas of the mold cavity 22 are to be filled at different times. Each pulse may be programmed to deliver a predetermined mass of gas, in that the pressure remaining within the accumulator 26 provides a continuous indication of the volume of gas remaining in the accumulator 26. In addition, the controller 48 can be programmed to anticipate each level of gas to be delivered to permit the downstream valve 36 to close slightly in advance of the desired level in situations where the response time of the downstream valve 36 is inadequate.

Being the primary factor by which the molding cycle is judged, the desired hold pressure can be compared to the actual hold pressure sensed by the pressure transducer 32. Any deviation in excess of the desired hold pressure will indicate that the gas has not properly expanded the molded article 21 within the mold cavity 22. In the same way, any deviation below the desired hold pressure will indicate that there is a system malfunction, such as inadequate boost pressure from the booster 24 or a malfunction in one of the valves 30, 36 and 40. A tolerance limit can be defined above and below the desired hold pressure which can be the basis for either sending an error signal to a control panel or, particularly where there is a substantial deviation, shutting down the system.

As a final step in the operation of the molding system 10, the downstream valve 36 is closed and the vent valve 40 is opened to vent the gas within the mold cavity 22 to atmosphere. The flow control valve 42 modulates the rate at which the gas will be vented, while the muffler 44 reduces the noise level which results from the release of high pressure gas to the atmosphere.

From the above, it can be seen that a significant advantage of the gas control unit 12 of the present invention is that the gas control unit 12 permits the evaluation of the injection cycle ergo, the molded article based upon the final hold pressure at the end of the cycle. Knowledge of the resulting hold pressure enables the gas control unit 12 to immediately and continuously detect whether the gas has in fact completely entered the mold cavity 22. As a result, the injection molding process can be continuously evaluated using statistical methods to ascertain immediately whether a flawed part has been produced.

In addition, the gas control unit can be adapted for use under differing modes of operation. Specifically:

(1) The gas control unit 12 can be operated entirely manually, with an operator estimating and manually setting the initial pressure within the accumulator 26. The resulting hold pressure need not be measured or used, though part quality may suffer under mass production conditions if the feedback available in the form of the hold pressure is not utilized to improve or maintain process quality.

(2) Alternatively, an operator may estimate and set an initial pressure (stored mass) for the accumulator 26. Once, after several attempts and readjustments are made to the initial pressure setting, a successful injection cycle has been achieved, the controller 48 can calculate the preferred hold-to-initial pressure ratio (i.e., the initial-to-final volume-to-temperature (V/T) ratio) for the molding system 10. The controller 48 can then evaluate subsequent cycles by comparing their initial-to-final V/T ratio with the preferred initial-to-final V/T ratio. This mode is particularly suitable for high volume production, in which the gas control unit 12 can regulate the injection molding process with minimal attention from an operator.

(3) As a final mode of operation, an operator can program the controller 48 to achieve a preferred hold pressure based entirely on molding requirements. The controller 48 can then make all initial assumptions, including system volume and temperature, and then estimate the initial pressure required within the accumulator 26 to produce the desired hold pressure. Thereafter, the resulting hold pressure can be compared to the preferred hold pressure, and the controller 48 can make self-adjustments to the initial pressure within the accumulator 26 until the desired hold pressure is achieved, at which time all of the relevant parameters are stored to memory.

This mode is particularly useful when controlling an initial run by which the requirements of a particular part or mold cavity geometry are being evaluated for mass production. The operational mode of the gas control unit 12 can then be switched to the second mode described immediately above for continuous operation.

Though providing the capabilities described above, the gas control unit 12 is relatively uncomplicated, relying upon the operation of a minimal number of fluid control devices. In addition, only a limited amount of information is needed to control a molding operation. Once the system desired hold pressure is known, the controller 48 call manage all of the mathematical computations necessary to determine the initial pressure to which the accumulator 26 is charged. This is possible because the mass of the gas within the gas control unit 12 remains constant during a given injection cycle. This is contrary to the prior art, in which the gas pressure is regulated upstream of the mold cavity to maintain a desired hold pressure in the mold cavity.

While the invention has been described in terms of a preferred embodiment, it is apparent that other forms could be adopted by one skilled in the art. For example, different mathematical algorithms could be used to evaluate the molding system. In addition, different flow control devices could be substituted for those described. Accordingly, the scope of the invention is to be limited only by the following claims.

What is claimed is:

1. A gas-assisted injection molding system for introducing a predetermined mass of a gas into a mold cavity in combination with a quantity of plastic material, said gas-assisted injection molding system comprising:

fixed volume means for accumulating a predetermined constant mass of said gas;

passage means in fluidic communication with said fixed volume accumulating means for communicating said predetermined constant mass of said gas to said mold cavity such that said predetermined constant mass of said gas is distributed between said fixed volume accumulating means, said passage means and said mold cavity whereby said predetermined constant mass of said gas remains substantially contained within said gas-assisted injection molding system;

means in communication with said fixed volume accumulating means for sensing a pressure of said gas within said fixed volume accumulating means after said gas is communicated to said mold cavity; and means for comparing said sensed pressure of said fixed volume accumulating means after said gas is communicated to said mold cavity with a predetermined pressure so as to verify that said predetermined constant mass of said gas in said fixed volume accumulating means has fully expanded throughout said injection molding system.

2. The gas-assisted injection molding system of claim 1 further comprising means in fluidic communication with said fixed volume accumulating means for charging said fixed volume accumulating means with said predetermined constant mass of said gas.

3. The gas-assisted injection molding system of claim 1 wherein said comparing means regulates the flow of said gas into said fixed volume accumulating means so as to establish said predetermined constant mass of said gas within said accumulating means.

4. The gas-assisted injection molding system of claim 2 wherein said means for charging said fixed volume accumulating means comprises a pressurized source of said gas.

5. A gas-assisted injection molding system for introducing a predetermined mass of a gas into a mold cavity in combination with a quantity of plastic material, said gas-assisted injection molding system comprising:

fixed volume means for accumulating a predetermined constant mass of said gas;

means in fluidic communication with said fixed volume accumulating means for charging said fixed volume accumulating means with said predetermined constant mass of said gas;

passage means in fluidic communication with said fixed volume accumulating means for communicating said predetermined constant mass of said gas to said mold cavity such that said predetermined constant mass of said gas is distributed between said fixed volume accumulating means, said passage means and said mold cavity whereby said predetermined constant mass of said gas remains substantially contained within said gas-assisted injection molding system;

means in communication with said fixed volume accumulating means for sensing a pressure of said gas within said fixed volume accumulating means after said gas is communicated to said mold cavity; and control means in communication with said pressure sensing means for comparing said sensed pressure with a predetermined pressure;

whereby said control means determines whether said predetermined constant mass of said gas in said fixed volume accumulating means has fully expanded throughout said injection molding system.

6. The gas-assisted injection molding system of claims 5 wherein said control means is in communication with said charging means for regulating the flow of said gas from said charging means into said fixed volume accumulating means so as to discontinue flow once said predetermined constant mass of said gas has accumulated in said fixed volume accumulating means.

7. The gas-assisted injection molding system of claim 5 further comprising means in communication with said control means for sensing a temperature of said gas within said fixed volume accumulating means.

8. The gas-assisted injection molding system of claim 5 wherein said means for charging said fixed volume accumulating means comprises a pressurized source of said gas.

9. The gas-assisted injection molding system of claim 5 wherein said control means is in communication with said communication means such that said communication means is regulated by said control means.

10. The gas-assisted injection molding system of claim 5 further comprising means in communication with said control means for regulating a molding machine comprising said mold cavity.

11. The gas-assisted injection molding system of claim 5 further comprising means for communicating said gas to said mold cavity in a series of successive steps until said predetermined constant mass of said gas has been substantially communicated between said fixed volume accumulating means and said mold cavity.

12. A method for introducing a volume of a gas into a mold cavity in combination with a quantity of plastic material, said method comprising the steps of:

accumulating a predetermined mass of said gas within a fixed volume accumulator;

communicating said predetermined mass of said gas from said fixed volume accumulator to said mold cavity such that said predetermined mass of said gas is distributed between said fixed volume accumulator and said mold cavity;

sensing a pressure of said gas in said fixed volume accumulator after said predetermined mass of gas is communicated to said mold cavity; and comparing said sensed pressure to a predetermined pressure so as to determine whether said mold cavity has been properly filled with said predetermined mass of said gas.

13. The method of claim 12 further comprising the steps of:

detecting a temperature of said gas;

determining said predetermined mass of gas by applying the ideal gas law $m = PV/RT$, wherein m is said predetermined mass of said gas, P is said predetermined pressure, V is a combined volume which includes said mold cavity, said fixed volume accumulator and a fluidic passage between said fixed volume accumulator and said mold cavity, R is the ideal gas constant for said gas, and T is said temperature; and charging said fixed volume accumulator with said predetermined mass of said gas by pressurizing said fixed volume accumulator to an initial pressure determined according to the ideal gas law $P = mRT/V$, wherein P is said initial pressure within said fixed volume accumulator, m is said predetermined mass of said gas, R is the ideal gas constant for said gas, T is said temperature, and V is the volume of said fixed volume accumulator.

14. The method of claim 12 wherein said steps of accumulating, communicating, sensing and comparing are regulated by a control device.

15. The method of claim 12 further comprising the step of charging said fixed volume accumulator with said predetermined mass of said gas from a pressurized source.

16. The method of claim 12 further comprising the step of controlling said communication step so as to communicate said gas to said mold cavity in a series of steps until said predetermined mass of said gas has been substantially communicated between said fixed volume accumulator and said mold cavity.

17. A method for introducing a predetermined mass of a gas into a mold cavity in combination with a quantity of plastic material, said method comprising the steps of:

supplying said gas from a pressurized source to a fixed volume accumulator having a fixed reservoir volume;

sensing a reservoir pressure of said gas within said fixed volume accumulator;

accumulating said gas within said fixed volume accumulator until said reservoir pressure corresponds to a predetermined mass of said gas;

communicating said predetermined mass of said gas from said fixed volume accumulator to said mold cavity such that predetermined mass of said gas is distributed between said fixed volume accumulator and said mold cavity;

sensing a final pressure in said fixed volume accumulator of said gas after said gas is communicated to said mold cavity; and comparing said final pressure to a predetermined pressure which corresponds to said predetermined volume so as to determine whether said mold cavity has been properly filled with said predetermined mass of said gas.

18. The method of claim 17 further comprising the step of determining a predetermined volume of said gas by determining a volume of said mold cavity and associated passages and subtracting therefrom a volume corresponding, to said quantity of plastic material.

19. The method of claim 17 wherein said steps of supplying, sensing said reservoir pressure and said temperature, accumulating, communicating, sensing said final pressure, evaluating and comparing are regulated by a control device.

20. The method of claim 17 further comprising the step of controlling said communicating step so as to communicate said gas to said mold cavity in a successive series of steps until said predetermined mass of said gas has been substantially communicated between said fixed volume accumulator and said mold cavity.

21. The method of claim 18 further comprising the step of generating an error signal when the difference between said final pressure and said predetermined mass exceeds a predetermined range.

* * * * *

UNITED STATES PATENT AND TRADEMARK OFFICE
CERTIFICATE OF CORRECTION

PATENT NO. : 5,411,685
DATED : May 2, 1995
INVENTOR(S) : Stephen A. Burgis

It is certified that error appears in the above-indentified patent and that said Letters Patent is hereby corrected as shown below:

Column 6, line 1, delete "THE" insert ---- the ----.

Column 8, line 31, delete "requirement" insert ---- requirements ----.

Column 10, line 45, delete "call" insert ---- can ----.

Column 11, line 31, after "said" insert ---- fixed volume ----.

Column 11, line 67, delete "claims" insert ---- claim ----.

Column 13, line 25, after "that" insert ---- said ----.

Column 14, line 13, delete ---- , ----.

Signed and Sealed this

Fifth Day of September, 1995

*Attest:*

BRUCE LEHMAN

*Attesting Officer*     *Commissioner of Patents and Trademarks*